SUPERCONDUCTORS

Filed Jan. 25, 1967

INVENTOR
ANTHONY CLIFFORD BARBER
FRANCIS JOHN VERNON FARMER

BY Cushman, Darby & Cushman
ATTORNEYS

United States Patent Office 3,465,429

Patented Sept. 9, 1969

3,465,429

SUPERCONDUCTORS

Anthony Clifford Barber, Lichfield, and Francis John Vernon Farmer, Erdington, England, assignors to Imperial Metal Industries (Kynoch) Limited, Witton, Birmingham, England, a corporation of Great Britain Filed Jan. 25, 1967, Ser. No. 611,660

Claims priority, application Great Britain, Jan. 27, 1966, 3,757/66; Mar. 21, 1966, 12,240/66; Jan. 13, 1967, 1,982/67, 1,983/67

Int. Cl. H01s *4/00;* B23p *17/00*

U.S. Cl. 29—599 13 Claims

ABSTRACT OF THE DISCLOSURE

A superconducting wire or rod is made by extruding or otherwise mechanically working a composite superconducting metal core, for example a Nb-Ti alloy, in a metal sheath, for example Cu, at elevated temperature to produce a bond between the core and sheath and subsequently drawing or otherwise cold working the resulting composite at ambient temperature to elongate the composite.

Background of the invention

This invention relates to superconductor materials and in particular to a method of manufacturing superconductors.

The phenomenon of superconductivity has been known for many years and several materials capable of good performance in high field environments are known, e.g. Nb-44 wt. percent Ti, Nb-67 wt. percent Ti, Nb-25 wt. percent Zr alloys, $Nb_3Sn$, $V_3Si$ and $V_3Ga$ compounds.

These materials, however, "degrade" when operated in a coil-form; the maximum characteristic (the ultimate current value) of a given superconductor is generally observed in short samples; when a superconducting filament is wound into a coil, the maximum properties are not obtained. This effect has been termed "degradation" and it results at least in part for local instabilities in flux motion (i.e. flux jumps) which produce local heating.

Description of prior art

It is known that simple surface plating of the superconductor with a normal material possessing good thermal and electrical conductivity, e.g. copper, improves the stability of the coil. The normal conductor material is thought to provide an alternate current path in the event of a local resistive region being formed and to provide a high thermal conductivity heat sink around the superconductor so as at least partially to stabilise the superconductor material by conducting away the heat produced by flux jumps, whereby the superconductor material is maintained below its critical temperature.

There are advantages to be gained from the use of fine filaments of superconducting material in these applications of which one is the degree of cold work that has been carried out on the superconductor material.

However, atlhough superconducting materials include several metals and alloys which have sufficiently good ductility to permit their manufacture in wrought forms such as wires, rods, sheet and tube, production of these materials in the fine filamentary forms required, and provided with a good conductor for improved stability, raises considerable difficulties. Hence it is an object of the invention to reduce these difficulties to a substantial degree.

Summary of the invention

According to the present invention, a method of making a composite electrical conductor comprises mechanically working together a ductile superconductor material with a ductile normal material of high electrical and thermal conductivities to enclose a ribbon, filament or layer of superconductor material in and bonded to a matrix of the normal material, the mechanical working together of the superconductor and normal materials being at least initially carried out at an elevated temperature which is high enough to produce the bond between the superconductor and normal materials, but below that at which a low melting point eutectic is formed between the superconductor and normal materials.

Preferably the method additionally comprises mechanically working together the superconductor and normal materials at approximately ambient temperatures.

The superconducting material is thereby reduced to a sufficiently small cross-section and contains the desired cold working, whilst being supported by the normal material; in practice, a very thin filament of superconducting material which is completely surrounded by the normal conductor and is in good thermal and electrical contact therewith can be obtained if required.

The high and ambient temperatures mechanical working may be carried out by extrusion, rolling, rod rolling, forging, swaging and drawing. Thus, extrusion may be carried out at high temperatures, followed by ambient temperature extrusion or drawing, or drawing may be used for both of these stages of working.

The composite may be constructed from one or more superconducting metals or alloys and one or more normal materials. A suitable superconducting metal is niobium, whilst examples of suitable superconducting alloys are niobium alloyed with one or more of the metals zirconium, titanium, hafnium and tantalum, such as niobium-44% titanium (by weight), and niobium-67% titanium, and ternary alloys of niobium with titanium, zirconium or hafnium. Also niobium-titanium alloys containing 0–3000 parts per million of interstitial elements such as carbon and/or oxygen and/or nitrogen and/or hydrogen may be used; it may be possible to carry out the invention with up to 5000 p.p.m. of interstitial elements. The normal materials available include copper (preferred), (aluminium, silver, indium and cadmium may also be applicable), and preferably have a very high electrical conductivity at cryogenic temperatures, e.g. 4.2° K. In addition, it is preferable that the working characteristics of the chosen superconductor and normal materials be very similar.

The interstitial elements are present in solution in the allow or as a dispersed phase, e.g. titanium nitride precipitates, present in the alloy in the form of fine particles suitable for flux pinning. The precipitate itself may cause pinning or, alternatively, it may assist dislocation network or tangle formation which may behave as pinning centres. A heat treatment before processing and/or during processing and/or after processing may be necessary for the formation of the most favourable internal structure for optimum superconducting properties in the composite. For example, the niobium-67% titanium alloy may be given a solution treatment above 700° C. and then quenched. The composite superconductor may be heat treated in the range 100–700° C., preferably 200–600° C., preferably further 250–450° C., in order to precipitate a fine particulate phase or phases in a form which may assist dislocation network formation (by the interaction between the dislocations formed during cold working and the fine particles precipitated during ageing); or which may themselves assist flux pinning. The structure may be further refined by additional cold work. If the niobium-44 wt. percent titanium is used, during or after the cold working, for optimum properties the composite conductor is subjected to a heat treatment at 200–500° C., preferably 300–450° C. to refine the dislocation tangles formed by working and/or to produce precipitation of the interstitial compounds.

The assemblies from which the composites are made may be constructed from superconducting material and normal material in a variety of forms, for example, foil, sheet, rod and tube, or preformed shapes such as castings. The normal metal may also be melted and cast around a core of superconducting material.

Brief description of the drawings

Typical ways of carrying out the method of the invention will now be more particularly described with reference to the accompanying drawings in which.

Description of the preferred embodiments

Figure 1:
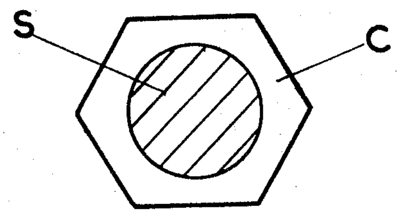
FIGURES 1 and 2 are end views of two products of the method of the invention.

Referring to the drawings, a cast (and/or wrought) billet of superconductor material, for example niobium-44 wt. percent titanium, is inserted in a tubular container of a high purity copper selected because of its high electrical conductivity of cryogenic temperatures of the order of 4.2° K. The container is closed and can be evacuated and sealed if required, but this is unnecessary provided that the surfaces to be bonded are not excessively contaminated.

The assembly of rod and container is then extruded at an elevated temperature which is high enough to produce a bond but below that at which a low melting point eutectic is formed between the alloy and the copper. Typically an extrusion ratio of 6:1 is used to produce a rod of 0.5 inch diameter, and extrusion is carried out in the temperature range 350–550° C., preferably 400–500° C.

Figure 2:
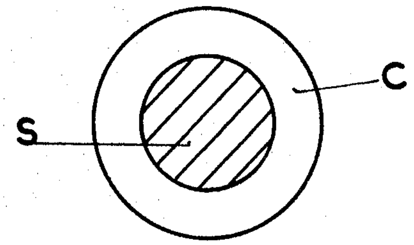

Further cold processing is carried out by drawing, in this example, to impart to the alloy the cold work necessary for optimum superconducting properties, and to produce the required dimensions. A diameter of 0.01 inch is typical. The resulting composite can be shaped as desired during cold working, and two typical configurations are shown in the drawings. In both cases an approximately cylindrical core of the superconductor alloy S is surrounded by a sheath of copper C, but in FIGURE 1 the composite is hexagonal in cross-section, whereby it is suitable for intimate stacking or winding with similar wires, and in FIGURE 2 the composite is circular in cross-section.

In modifications of the invention other forms of working the composite are utilised, such as swaging and rod-rolling. If required, extrusion, including hydrostatic extrusion, could possibly be used for cold as well as hot-working the composite, but preferably drawing is used throughout, i.e. for hot- as well as cold-working. By using drawing techniques, longer lengths of copper containers and billets of superconductor alloy can readily be handled. This means that longer lengths of composite wire are eventually produced.

As an alternative, instead of assembling the components of the composite conductor all in the solid state, the core of superconductor material can be located in a mould and the copper matrix cast around it. The composite is then extruded or drawn as described above. In this method, there is considerable latitude in the variety of shapes of the core of superconductor material.

Furthermore, the matrix can be preformed as a block of copper containing apertures into which the superconducting material is inserted. Such a block may be a casting or a piece of wrought metal in which an aperture is machined. After inserting the superconducting core, the method follows that for the cast matrix composite above.

We claim:

1. A method of manufacturing a composite electrical conductor comprising taking an element of a ductile superconductor material selected from the group consisting of the alloys niobium-67 wt. percent titanium and niobium-44 wt. percent titanium; subjecting the superconductor alloy to a solution treatment above 700° C.; quenching the superconductor alloy from the temperature of the solution treatment; providing the element with a sheath of a ductile normal material; mechanically working together the element of the ductile superconductor material and the sheath of the ductile normal material, at an elevated temperature which is high enough to produce a bond between the ductile superconductor material and the ductile normal material, but which is below the temperature at which a low melting point eutectic is formed between the superconductor and normal materials; and subsequently working together the element of ductile superconductor material and the sheath of ductile normal material at approximately ambient temperatures to cold work and elongate the element of ductile superconductor material in and bonded with the sheath of the normal material.

2. A method according to claim 1 wherein the composite electrical conductor is heat-treated at 100 to 700° C. to precipitate at least one fine dispersed phase.

3. A method according to claim 2 wherein the heat treatment is carried out at 250 to 450° C.

4. A method according to claim 1 wherein the composite electrical conductor is given a heat treatment at 200 to 500° C. after the commencement of working at approximately ambient temperatures.

5. A method according to claim 4 wherein the heat treatment is at 300 to 450° C.

6. A method according to claim 1 wherein the ductile normal material is selected from the group consisting of copper, aluminium, silver, indium and cadmium.

7. A method of manufacturing a composite electrical conductor comprising providing at least one element of a ductile superconductor material, which comprises an alloy selected from the group consisting of niobium-67 weight percent titanium and niobium-44 weight percent titanium, with a sheath of a ductile normal material; mechanically working together the element of the ductile superconductor material and the sheath of the ductile normal material at an elevated temperature which is high enough to produce a bond between the ductile superconductor material and the ductile normal material, but which is below the temperature at which a low melting point eutectic is formed between the superconductor and normal materials; subsequently working together the element of ductile superconductor material and the sheath of ductile normal material at approximately ambient temperatures to cold work and elongate the element of ductile superconductor material in and bonded with the sheath of the normal material and heat treating said alloy at some point in said method by solution treating above 700° C. and then quenching.

8. A method according to claim 7 wherein the composite electrical conductor is heat treated at 100 to 700° C. to precipitate at least one fine dispersed phase.

9. A method according to claim 8 wherein said composite conductor is heat treated at 250 to 450° C.

10. A method according to claim 7 wherein the ductile normal material is selected from the group consisting of copper, aluminium, silver, indium and cadmium.

11. A method of manufacturing a composite electrical conductor comprising providing an element of a ductile superconductor material, which comprises an alloy selected from the group consisting of niobium-67 weight percent titanium and niobium-44 weight percent titanium, with a sheath of a ductile normal material; mechanically working together the element of the ductile superconductor material and the sheath of the ductile normal material at an elevated temperature which is high enough to produce a bond between the ductile superconductor material and the ductile normal material, but which is below the temperature at which a low melting point eutectic is formed between the superconductor and normal materials; subsequently working together the element of ductile superconductor material and the sheath of ductile normal material at approximately ambient temperatures to cold work and elongate the element of ductile superconductor material in and bonded with the sheath of the normal material, and heat treating said composite electrical conductor at 200 to 500° C. after commencement of working at approximately ambient temperature.

12. A method according to claim 11 wherein said heat treatment is at 300 to 450° C.

13. A method according to claim 11 wherein the ductile normal material is selected from the group consisting of copper, aluminium, silver, indium and cadmium.

References Cited

UNITED STATES PATENTS

| | | | |
|---|---|---|---|
| 3,109,963 | 11/1963 | Geballe | 29—599 |
| 3,218,693 | 11/1965 | Allen et al. | 29—599 |
| 3,243,871 | 4/1966 | Saur | 29—599 |
| 3,262,187 | 7/1966 | Allen et al. | 29—599 |
| 3,370,347 | 2/1968 | Garwin et al. | 29—599 |
| 3,371,407 | 3/1968 | Forsyth et al. | 29—419 X |

PAUL M. COHEN, Primary Examiner

U.S. Cl. X.R.

29—194, 198, 423, 528